L. L. BETTYS.
Potato Digger.
No. 89,547.
Patented May 4, 1869.
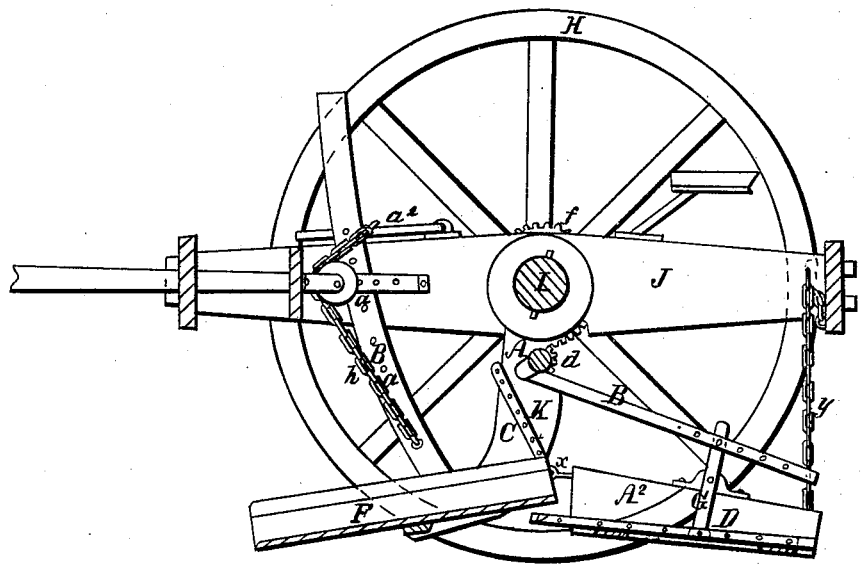

United States Patent Office.

LAFAYETTE L. BETTYS, OF ONTARIO, NEW YORK.

Letters Patent No. 89,547, dated May 4, 1869.

---

IMPROVEMENT IN POTATO-DIGGER.

---

The Schedule referred to in these Letters Patent and making part of the same.

---

*To all whom it may concern:*

Be it known that I, LAFAYETTE L. BETTYS, of Ontario, in the State of New York, have invented a new and useful Potato-Digger; and I do hereby declare that the following is a full, clear, and exact description thereof, reference being had to the accompanying drawing, making part of this specification, in which the figure is a vertical longitudinal section.

The nature of my invention will be understood from the drawings and specifications.

To enable others skilled in the art to make and use my invention, I will describe its construction and operation.

On the axle L of the wheels H I place a frame, J.

To the axle L, a hanger, K, is attached, so that it moves freely on it as its axis.

The lower ends of the hangers are sustained in any desirable adjustment by the movable brace E, which is fastened to the frame J by a pin being put through the frame and any of the desired holes $a$.

To the movable brace E, a chain, $h$, is attached.

The other end of this chain is connected to a lever, $a^2$, so that by raising or lowering it, the scoop may be raised or lowered when desired.

Between the hangers K I pivot a scoop, F, which has a round bottom. The scoop is pivoted at or near its centre, and near the end of the hangers K.

The rear end of the scoop is held in any desirable position vertically by the adjustable brace $c$.

The adjustable brace $c$ is fastened to the hangers K by a pin put through it and any of the holes $e$.

Between the hangers K, as a support, and near the axle L, I place a double-crank shaft, A.

On one end of this shaft I key a pinion, $d$, which is driven by a spur-wheel, $f$, keyed on the hub of the wheel H, which gives motion to the shaft.

To the crank I attach connecting-rods B, that extend to the rear of the machine, and are provided with a vertical slot to receive the vibrating arms C.

In rear of the scoop F, a boss, $A^2$, is attached by rods $x$, and it is sustained in the rear by a chain, $y$, which is attached to hooks in the frame J, by which it can be vertically adjusted.

The bottom of the box $A^2$ is provided with grooves on each side, which receive a sieve, D.

This sieve is joined to the connecting-rods B by the vibrating arms C, which are pivoted on the top of the box $A^2$. The lower ends work in slots in the sieve D.

The object of this invention is to produce a cheap and efficient potato-digger.

The operation is as follows:

The scoop F being set at the desired inclination for entering the ground by the adjustment of the braces E, the sieve D and box $A^2$ are set at convenient inclination from front to rear to cause the potatoes to pass off. The agitating-bars C are arranged so as to give proper travel to the sieve D by placing their tops opposite the desired hole in the connecting-rods B, and putting in a pin. The object of having a slot in the connecting-rod is to be able to move the top of the agitating-arms C to suit the angle the scoop bears to the sieve-box. As they are placed more in a direct line with one another, the tops of the vibrating arms are thrown towards the front end of the slot, and *vice versa.*

By this means the sieve moves between the same points, and the agitating-arms are retained in the slot in the sieve without being fastened. As the machine is drawn forward the scoop enters the ground, and a longitudinal motion is imparted to the sieve by the crank-shaft and its connections. The dirt and potatoes pass over the scoop on to the sieve, and are separated.

What I claim as my invention, and desire to secure by Letters Patent, is—

1. The hanger K, brace E, chain $h$, lever $a^2$, in combination with the scoop F, as and for the purpose herein shown and described.

2. The adjustable brace $e$ and hangers K, in combination with the scoop F and sieve D, as and for the purpose set forth.

3. The crank-shaft A, connecting-rods B, vibrating arms C, in combination with the longitudinally-reciprocating screen D, arranged and operating as herein shown and for the purpose set forth.

LAFAYETTE L. BETTYS.

Witnesses:
JAS. LORENZO GAGE,
F. H. CLEMENT.